Patented Aug. 7, 1945

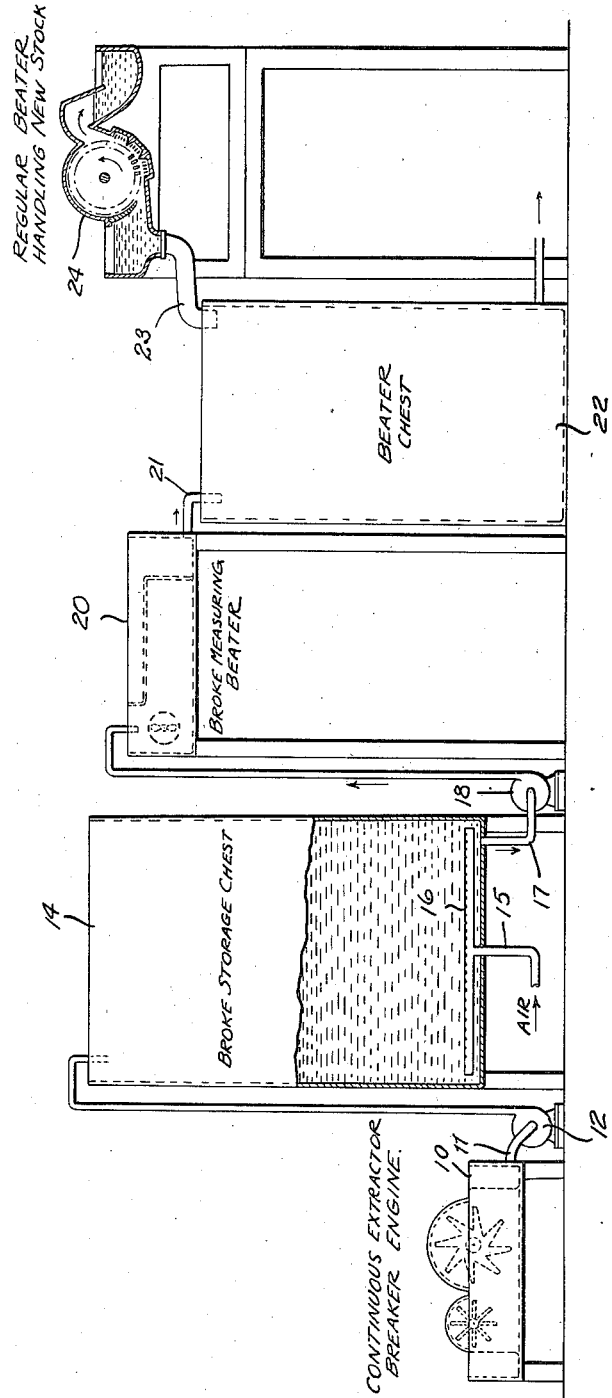

2,381,600

UNITED STATES PATENT OFFICE 2,381,600

PROCESS OF MAKING PAPER

Otto Kress, Appleton, Wis., and Frank Zeitlin and Robert K. Staman, Mechanicville, N. Y., assignors to West Virginia Pulp and Paper Company, New York, N. Y., a corporation of Delaware Application May 8, 1941, Serial No. 392,404

5 Claims. (Cl. 92—21)

Our present invention relates to the utilization of so called "broke" of one type of paper in the manufacture of other types. Specifically, it has to do with the utilization of the broke from the manufacture of calcium sulfite ($CaSO_3$) filled paper in the manufacture of other types of paper, as for example, clay filled paper. So called "broke" is the term applied to paper that is discarded during manufacture and consists of trimmings, edges, wrinked and imperfect paper, etc.; it amounts to several per cent. of the total output of the machine. It is re-used in the paper making operations by being repulped and added to the furnish of stock to the paper machine. In the manufacture of other papers the use of the broke accumulated from the manufacture of calcium sulfite paper, either alone or in admixture with broke from other sources, has resulted in excessive foaming on the paper machine.

After considerable study we have discovered that the excessive foaming resulting from the use of repulped calcium sulfite broke is due to the presence of finely divided calcium sulfate ($CaSO_4$) derived by oxidation from the $CaSO_3$ in the paper from which all or part of the broke was formed. Calcium sulfate is a well known filler for paper, and in its customary form is unobjectionable and even desirable. However, when newly formed under the conditions obtaining in the beater chest or machine chest or within an hour or so previous to entering these chests, the calcium sulfate particle size is exceedingly small, which gives rise to foaming if stock containing even minute quantities of such very finely divided calcium sulfate is run on a paper machine. On the other hand, when the particle size is sufficiently large, difficulty from foaming disappears.

The origin of the finely divided, i. e., colloidal, calcium sulfate may be explained as follows: The $CaSO_3$ filled paper broke, when normally repulped, alone or with other paper broke, is not oxidized to any extent because the presence of the CaSO keeps the pH substantially above 5.0 at which the oxidation is found to be very slow. However, when this broke is prepared for or is added to the furnish of another type of paper in which at some stage or other the pH drops below 5, as for example in the manufacture of clay filled paper or in sized paper containing substantially no filler, the $CaSO_3$ is readily dissolved in the water as calcium bisulfite, $Ca(HSO_3)_2$, and is then easily oxidized by the oxygen of the air beaten into the stock in process. This oxidation may be represented by the equation:

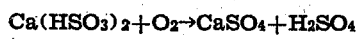

$$Ca(HSO_3)_2 + O_2 \rightarrow CaSO_4 + H_2SO_4$$

When this oxidation occurs, as in the manufacture of a clay filled sheet, the oxidation is sufficiently slow so as to result in the formation of a sufficient quantity of very finely divided calcium sulfate, i. e., of colloidal or extremely fine particle size, as to give rise to foaming. One reason that the low pH is encountered in the manufacture of a clay filled sheet or sheet having substantially no filler is, that when the sheet is sized, an acidic reagent, usually alum, is added, which reacts with the rosin added to form the necessary size.

It is therefore a principal object of our invention to overcome the objectionable foaming attendant upon the use of calcium sulfite broke, either alone or in admixture with broke from other papers in the manufacture of paper having other fillers, or papers substantially unfilled, without having to maintain a pH of substantially more than 5 in the engines, tanks, chests, flow boxes, etc., through which the broke pulp or the paper making furnish may pass—a matter which would be extremely difficult or impracticable to carry out, at least when rosin size is used.

In carrying out our invention we make use of conditions resulting in the conversion of calcium sulfite into calcium sulfate of sufficient particle size as not to occasion the formation of foam. In the normal operation of beating the broke into pulp, air required for oxidation of the $CaSO_3$ is necessarily beaten into the pulp as the latter is formed. It is, however, necessary in order for the oxidation reaction to take place, that the pH of the pulp be adjusted to a value not in excess of 5, and preferably between 4 and 4.5. The temperature should be fairly high, preferably in the range 80° F. and 150° F. Desirably, after the broke has been converted into pulp and conveyed to the broke storage chest, it is further aerated there to complete oxidation, and before the formation of a new sheet of paper it is necessary that sufficient time elapse in order that the particle size of the calcium sulfate may be permitted to build up to a point where foaming does not occur. Normally the amount of time elapsing during which the treated broke is in circuit leading up to the head box of the machine, which may amount to a period of hours, is sufficient to bring this about.

Our invention may be somewhat better understood by reference to the annexed drawing which shows diagrammatically a preferred mode of treatment of the calcium sulfite broke in accordance with our invention. Dry broke consisting of all or a portion of calcium sulfite filled paper is conveyed to the breaker engine 10, which may be of the continuous type. Thereupon sufficient acid material, either in the form of paper maker's alum or sulfuric acid, is added to the broke undergoing pulping, to bring the pH down to the range preferably of 4 to 4.5. Also, steam may be admitted to maintain the temperature in the range preferably from 80° F. to 150° F. Due to the beating action the broke is converted into pulp which is continuously withdrawn through pipe 11, passing by means of pump 12 to broke storage chest 14. Here the broke pulp preferably receives further aeration by air introduced through the pipe 15 leading into perforated coil 16. Obviously, either one or a plurality of broke storage chests may be employed as is best suited to existing facilities of the paper manufacturer. Under the conditions of acidity and high temperature the calcium sulfite is oxidized by the atmospheric oxygen to calcium sulfate. The reaction is, as above stated, the formation of calcium bisulfite by the action of the acid or acid salt (alum), and then the oxidation of the latter to calcium sulfate.

The treated pulp is then withdrawn as needed from the storage chest 14 through pipe 17 by means of pump 18, and passed to so called broke measuring beater 20, the principal purpose of which is to afford a proper measure of the pulp used. This beater communicates, through pipe 21, with one or more beater chests 22. Also communicating with chest 22 through pipe 23 is beater 24 handling new stock. After the pulp has been in the beater chest for the requisite time it is removed therefrom and, after having various operations normal to paper making practice performed upon it, is passed to the head box of the paper making machine, not shown.

It will be understood that the calcium sulfite, after oxidation to calcium sulfate, will be maintained in the stock system prior to flowing onto the wire of the paper making machine for a period of hours, as it is found that if the freshly formed calcium sulfate is added to the furnish, foaming will result. If, however, the furnish containing the freshly formed calcium sulfate is allowed to stand for a period of hours, foaming is eliminated. Our explanation for this, as above pointed out, is that by standing, the particle size of the calcium sulfate is increased to the point where foaming no longer occurs.

It will be seen from the foregoing that our invention permits the use of calcium sulfite broke in the manufacture of clay filled paper, for example, the same as if it were clay filled broke, whereby segregation and storage of the calcium sulfite broke (requiring extra equipment and storage space) until such time as calcium sulfite papers are again run, are eliminated.

While we have illustrated and described in detail certain preferred forms of our invention, it is to be understood that changes may be made therein and the invention embodied in other structures. We do not, therefore, desire to limit ourselves to the specific construction illustrated, but intend to cover our invention broadly in whatever form its principle may be utilized.

We claim:

1. The method of utilizing calcium sulfite broke in the manufacture of paper by incorporating same in the form of pulp in the furnish to the paper making machine, in which the pH of the furnish falls to 5 or below, which consists in pulping said calcium sulfite broke in the presence of air and under pH conditions of 5 or below to oxidize the calcium sulfite substantially completely to calcium sulfate, and introducing the so treated broke pulp into the machine after the calcium sulfate no longer causes objectionable foaming.

2. The method of utilizing calcium sulfite broke in the manufacture of paper, in which the pH of the furnish may fall to 5 or below, which consists in pulping the broke; maintaining the pH of the broke pulp so formed below 5 while affording contact of the pulp with oxygen until substantially all the calcium sulfite is oxidized to calcium sulfate, but withholding the so treated broke pulp from the machine until the formed calcium sulfate will no longer cause objectionable foaming, and then adding the pulped broke so withheld to said furnish.

3. The method according to claim 2, in which the pH of the pulp broke during oxidation is maintained at from 4 to 4.5, and the temperature maintained at 80° to 150° F.

4. The method of utilizing calcium sulfite broke in the manufacture of paper by incorporating same in the form of pulp in the furnish to the paper making machine, which furnish does not contain any substantial quantity of calcium sulfite as a filler, and in which the pH of the furnish falls to 5 or below, which consists in beating the said calcium sulfite broke into pulp, passing the broke pulp so formed to a chest, there aerating said broke pulp under pH conditions of 5 or below until oxidation of the calcium sulfite to calcium sulfate is substantially complete, but withholding such aerated broke pulp from said machine until the formed calcium sulfate will no longer cause objectionable foaming.

5. The method of utilizing calcium sulfite broke in the manufacture of paper by incorporating same in the form of pulp in the furnish to the paper making machine, which furnish does not contain any substantial quantity of calcium sulfite as a filler, and in which the pH of the furnish falls to 5 or below, which comprises the steps of beating the broke into pulp at a beating station, temporarily storing the broke pulp in a chest at a storage station, and converting substantially all the calcium sulfite to calcium sulfate, the converting including aeration of said broke pulp under pH conditions of 5 or below at at least one of said stations, but withholding such aerated broke pulp from said machine until the formed calcium sulfate will no longer cause objectionable foaming.

OTTO KRESS.
FRANK ZEITLIN.
ROBERT K. STAMAN.